US012677150B2

(12) United States Patent
Nataraj et al.

(10) Patent No.: US 12,677,150 B2
(45) Date of Patent: Jul. 7, 2026

(54) STATEFUL MULTI-PRIVILEGED SD-WAN CONTROL CONNECTIONS

(71) Applicant: Cisco Technology, Inc., San Jose, CA (US)

(72) Inventors: Venkatesh Nataraj, Union City, CA (US); Angelica Jirina Semenec, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 266 days.

(21) Appl. No.: 18/489,611

(22) Filed: Oct. 18, 2023

(65) Prior Publication Data

US 2025/0063360 A1 Feb. 20, 2025

Related U.S. Application Data

(60) Provisional application No. 63/532,814, filed on Aug. 15, 2023.

(51) Int. Cl.
| | |
|---|---|
| *H04W 12/069* | (2021.01) |
| *H04L 9/40* | (2022.01) |
| *H04W 12/71* | (2021.01) |

(52) U.S. Cl.
CPC ....... *H04W 12/069* (2021.01); *H04L 63/0823* (2013.01); *H04L 63/10* (2013.01); *H04L 63/20* (2013.01); *H04W 12/71* (2021.01)

(58) Field of Classification Search
CPC ... H04L 63/0823; H04L 63/20; H04L 9/3263; H04L 9/3265; H04L 9/3268; H04L 63/10; H04W 12/069; H04W 12/71
See application file for complete search history.

(56) References Cited

U.S. PATENT DOCUMENTS

| | | | |
|---|---|---|---|
| 7,533,407 B2 * | 5/2009 | Lewis | G06F 21/577 |
| | | | 726/25 |
| 8,458,462 B1 | 6/2013 | Hanna | |

(Continued)

FOREIGN PATENT DOCUMENTS

| | | | | |
|---|---|---|---|---|
| CN | 117040749 A | * | 11/2023 | .......... H04L 9/3263 |
| JP | 2008271242 A | * | 11/2008 | |

(Continued)

OTHER PUBLICATIONS

Cisco, "Expired Enterprise Certificate Indication and Quarantine", obtained online from https://www.cisco.com/c/en/us/td/docs/routers/sdwan/configuration/sdwan-xe-gs-book/expired-cert-quarantine.pdf, retrieved on 9.*

(Continued)

*Primary Examiner* — Zhimei Zhu
(74) *Attorney, Agent, or Firm* — Lee & Hayes, P.C.

(57) ABSTRACT

This disclosure describes techniques to establish and manage stateful multi-privileged control connections between edge devices and a controller of a SD-WAN. The described techniques may receive request(s) and/or data from edge device(s) that include certificates. The described techniques may utilize criteria to determine validity and acceptability of the certificates during authentication. Where the controller determines a certificate in invalid and acceptable, the described techniques move the edge device to a new quarantine state. In the quarantine state, an edge device maintains the control connection with the controller in order to remediate the certificate, but restricts access to the data plane to reduce security risks. A notification may be generated and displayed to an administrator in response to determining a certificate is invalid and acceptable and/or in response to moving the edge device to the quarantine state. Accordingly, (Continued)

the described techniques improve SD-WAN infrastructure and reduce security risks.

15 Claims, 7 Drawing Sheets

(56)                    References Cited

U.S. PATENT DOCUMENTS

| | | | |
|---|---|---|---|
| 8,949,597 B1 * | 2/2015 | Reeves | H04L 9/3268 |
| | | | 726/4 |
| 9,325,697 B2 * | 4/2016 | Datta | H04L 63/10 |
| 11,388,594 B2 * | 7/2022 | Uy | H04L 9/0844 |
| 11,729,062 B1 | 8/2023 | Daw et al. | |
| 2006/0085850 A1 | 4/2006 | Mayfield et al. | |
| 2008/0034410 A1 * | 2/2008 | Udupa | H04L 63/0272 |
| | | | 713/185 |
| 2016/0112246 A1 | 4/2016 | Singh et al. | |
| 2016/0173488 A1 * | 6/2016 | Xie | H04L 9/3263 |
| | | | 713/156 |
| 2017/0099284 A1 * | 4/2017 | Balmakhtar | H04L 63/166 |
| 2018/0097640 A1 * | 4/2018 | Queralt | H04L 63/0815 |
| 2018/0097803 A1 * | 4/2018 | Iwanir | H04L 63/14 |
| 2020/0021575 A1 * | 1/2020 | Rezvani | H04L 63/20 |
| 2020/0287888 A1 | 9/2020 | Moore et al. | |
| 2021/0067505 A1 | 3/2021 | Gandhi et al. | |
| 2021/0243159 A1 * | 8/2021 | Meng | H04L 63/1425 |
| 2021/0360401 A1 | 11/2021 | Marinho et al. | |
| 2022/0353684 A1 | 11/2022 | Marinho et al. | |
| 2024/0378286 A1 * | 11/2024 | Bakshi | G06F 9/485 |
| 2025/0217171 A1 * | 7/2025 | Saraiya | G06Q 10/0635 |
| 2025/0217172 A1 * | 7/2025 | Saraiya | G06F 16/9017 |

FOREIGN PATENT DOCUMENTS

| | | | | |
|---|---|---|---|---|
| WO | WO-9935782 A1 * | 7/1999 | | H04L 63/1441 |
| WO | WO-02089076 A2 * | 11/2002 | | G06Q 20/12 |

OTHER PUBLICATIONS

"Recovering from expired control plane certificates", obtained from <https://web.archive.org/web/20211126233422/https://docs.okd.io/latest/backup_and_restore/control_plane_backup_and_restore/disaster_recovery/scenario-3-expired-certs.html>, retrieved on Oct. 15, 2025. (Year: 2021).*

"Certificate Path Validation Failed", (Year: 2019), obtained online from <https://forum.inductiveautomation.com/t/certificate-path-validation-failed/25965>, retrieved on Feb. 19, 2026.*

Search Report and Written Opinion for International Application No. PCT/US2024/042205, Dated Dec. 2, 2024, 14 pages.

* cited by examiner

200
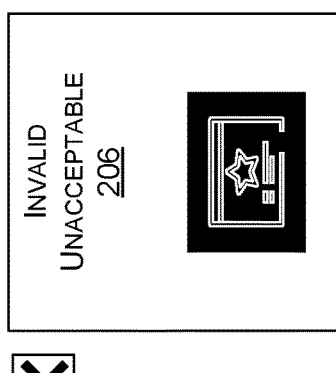
INVALID
UNACCEPTABLE
206
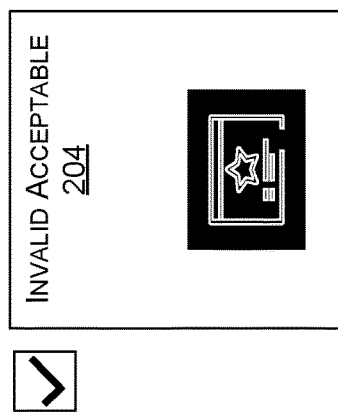
INVALID ACCEPTABLE
204
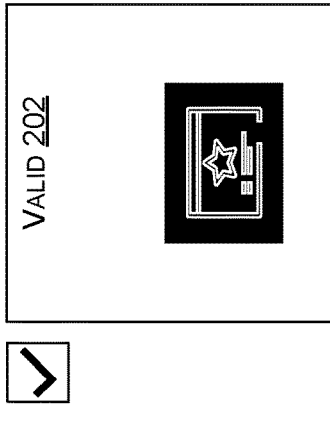
VALID 202
FIG. 2

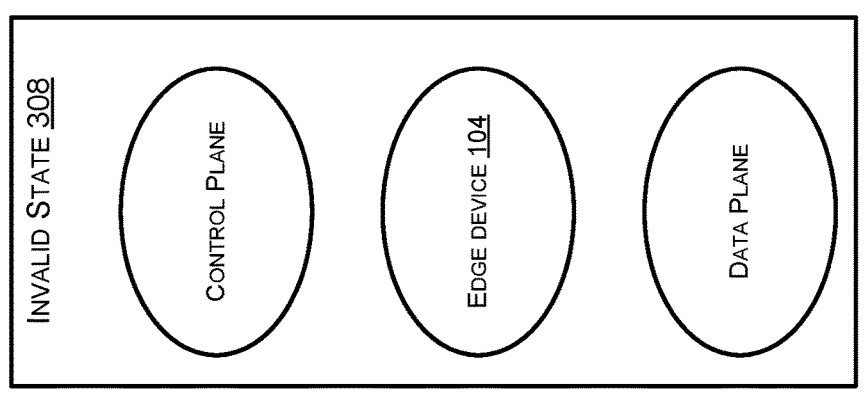
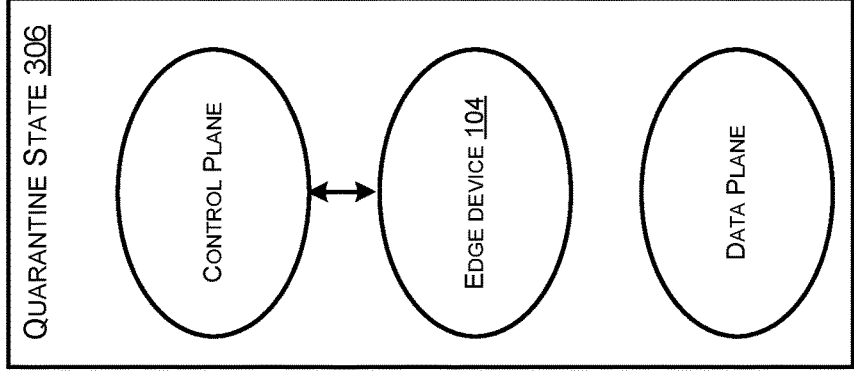
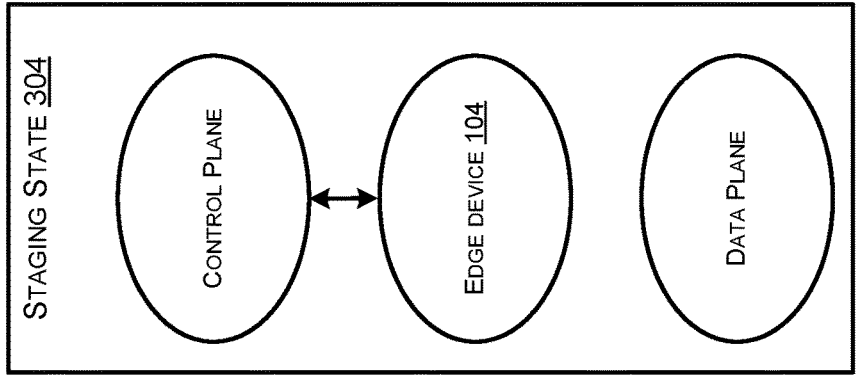
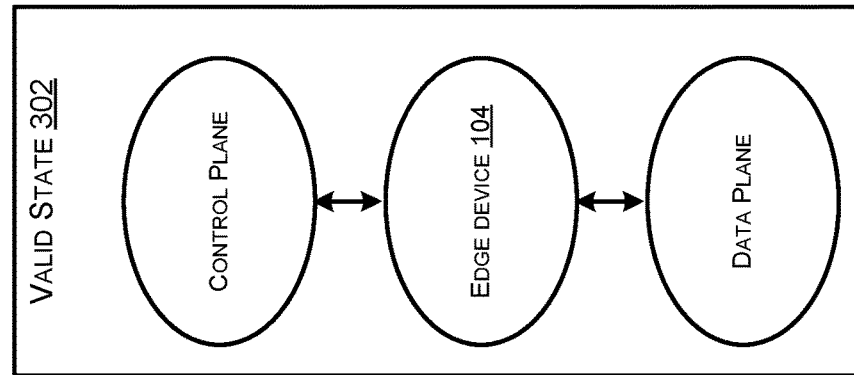
FIG. 3A

400

RECEIVE A REQUEST FROM AN EDGE DEVICE TO FORM A CONTROL CONNECTION WITH A CONTROLLER TO ACCESS A NETWORK, THE REQUEST INCLUDING A CERTIFICATE
402

DETERMINE, BASED ON CRITERIA ASSOCIATED WITH THE CERTIFICATE, THAT THE CERTIFICATE IS INVALID AND ACCEPTABLE
404

MOVE THE EDGE DEVICE TO A QUARANTINE STATE
406

CAUSE A NOTIFICATION TO BE DISPLAYED ON A USER INTERFACE
408

500

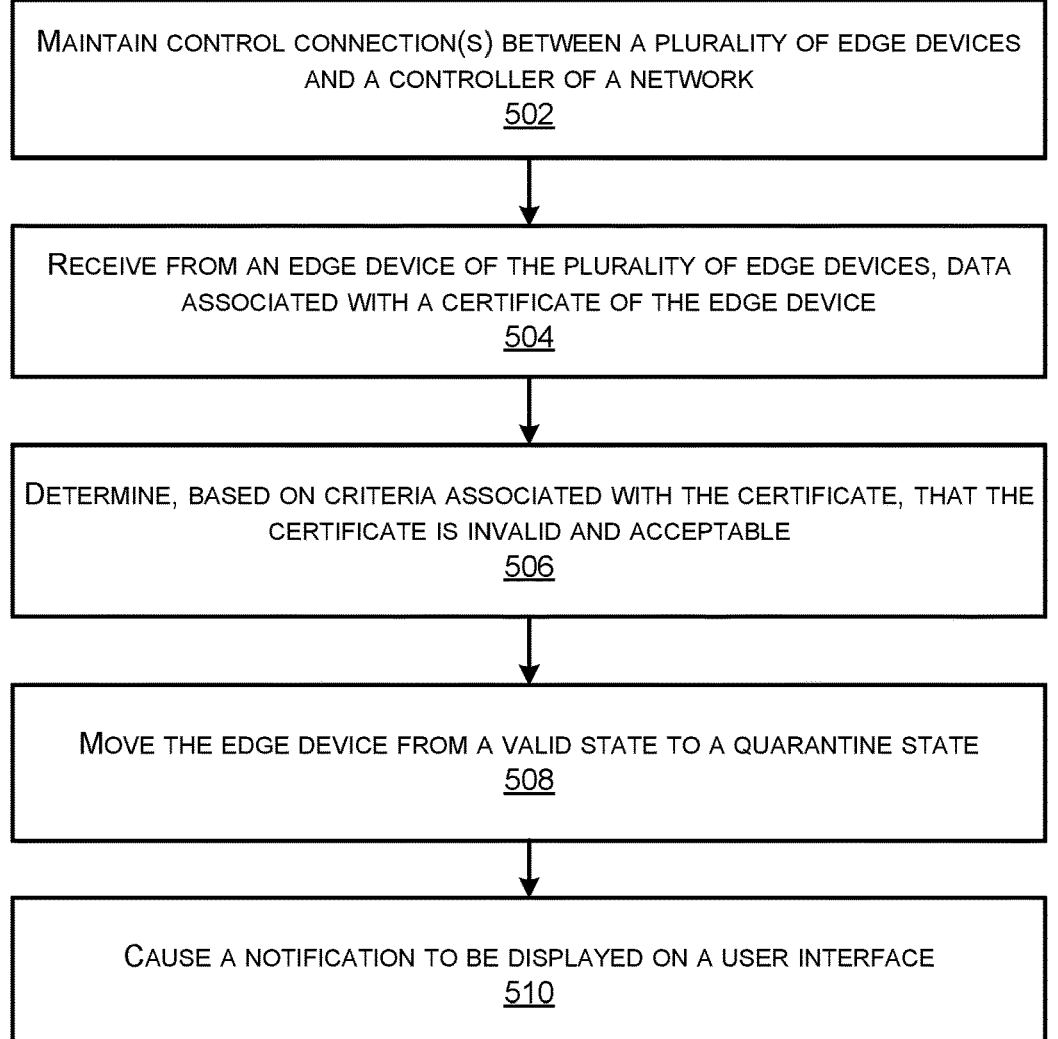

MAINTAIN CONTROL CONNECTION(S) BETWEEN A PLURALITY OF EDGE DEVICES AND A CONTROLLER OF A NETWORK
502

RECEIVE FROM AN EDGE DEVICE OF THE PLURALITY OF EDGE DEVICES, DATA ASSOCIATED WITH A CERTIFICATE OF THE EDGE DEVICE
504

DETERMINE, BASED ON CRITERIA ASSOCIATED WITH THE CERTIFICATE, THAT THE CERTIFICATE IS INVALID AND ACCEPTABLE
506

MOVE THE EDGE DEVICE FROM A VALID STATE TO A QUARANTINE STATE
508

CAUSE A NOTIFICATION TO BE DISPLAYED ON A USER INTERFACE
510

FIG. 5

STATEFUL MULTI-PRIVILEGED SD-WAN CONTROL CONNECTIONS

CROSS REFERENCE TO RELATED APPLICATIONS

This application claims priority to U.S. Provisional Patent Application No. 63/532,814, filed on Aug. 15, 2023, the entire contents of which are incorporated herein by reference

TECHNICAL FIELD

The present disclosure relates generally to the field of computer networking, and more particularly to providing and managing stateful multi-privileged control connections between edge devices and controllers in a SD-WAN.

BACKGROUND

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of networks, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches may allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

An example network is a software defined wide area network (SD-WAN). Certificates are a critical part of authentication and authorization for establishing secure connections for the SD-WAN control plane. The "certificate" refers to certificates that edge devices may present to controllers within the control plane for secure control connection establishment. A certificate may become invalid if it expires, any of its issuer certificates expire, the issuer certificate is missing from the trust store, and many other reasons. Time, changes in the network, or data corruption may also lead to the invalidation of a certificate.

The validity of these certificates plays a key role in determining whether a control connection is allowed to establish or not. The SD-WAN control plane has been designed so that control connection establishment attempts are automatically rejected for edge devices presenting invalid certificates. In these situations, an edge device must be re-onboarded (e.g., such as via out-of-band (OOB) access or physical access to the edge device). As a result, existing SD-WAN infrastructure does not enable certificate issues to be corrected and requires the edge device to be re-onboarded in order to re-enter the network (e.g., after the certificate has been corrected through OOB access or physical access).

However, requiring physical access to an edge device is expensive and time intensive, as edge devices can be located in remote areas anywhere in the world. Further, while OOB access provides a remote connection to the edge device, the connection can be exploited by malicious actors to access a data plane of the network. Thus, OOB access presents a security risk to the network.

Moreover, existing techniques for managing certificates include using a certificate revocation list (CRL), which is a collection of certificates no longer considered valid by the issuing certificate authority (CA). Some SD-WAN networks and devices support the RFC 5280 definition of CRL for third-party (enterprise) CAs. A certificate may be revoked and appear on a CRL for a number of reasons: a certificate's private key has been compromised; the CA incorrectly issues a certificate; the CA itself has been compromised; some organizational details have changed, etc. CRLs can grow to a very large size, so it does need to be trimmed over time by removing certificates. All certificates have a validity period, a start date in which the certificate first becomes valid and an end date in which the certificate expires. It is the end date that is used to facilitate the removal of a certificate from a CRL as expired certificates are, in general, no longer considered valid. In general, CRL protects various entities along the chain of trust from varying security risks.

However, the use of CRLs does not provide flexibility or the ability to react in an emergency situation. For instance, where a root CA certificate expires, a customer SD-WAN may experience large outages. In this instance, the user needs to generate and deploy massive amounts of software across many different versions and re-deploy the network to re-establish connectivity to the affected edge devices. In some cases, re-onboarding the edge devices may be required, such as where there is a complete loss of connectivity and/or physical access to the network. This is not only time intensive but costly across the network.

Accordingly, there is a need for a flexible, cost-effective, and more secure way to manage control connections between edge devices and controllers within a SD-WAN.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2 illustrates an example of certificate verification classifications associated with the system described in FIG. 1.

FIG. 3A illustrates examples of edge states of a data plane in accordance with the techniques described herein.

FIG. 5 illustrates a flow diagram of an example method for managing stateful multi-privileged control connections using the system described in FIGS. 1-4.

DESCRIPTION OF EXAMPLE EMBODIMENTS

Overview

Figure 1:
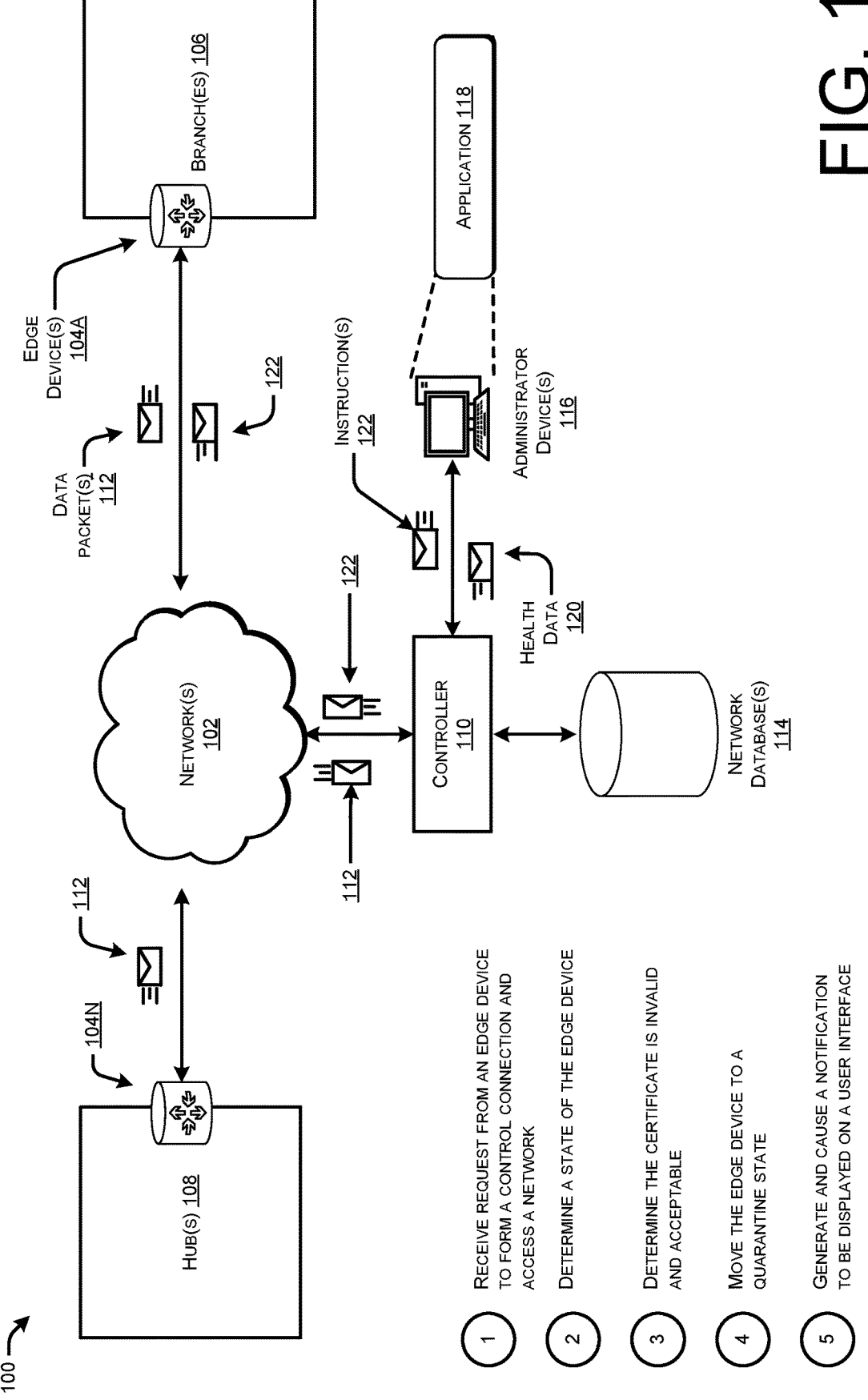
FIG. 1 illustrates an example environment for a system to provide stateful multi-privileged control connections between edge devices and controllers in a SD-WAN as described herein.

The present disclosure relates generally to the field of computer networking, and more particularly to providing stateful multi-privileged control connections between edge devices and controllers in a SD-WAN.

A method to perform the techniques described herein may be implemented by a controller of a network that manages control connections within the network. The method may comprise receiving a request from an edge device to form a control connection with the controller and access the network, the request including a certificate. The method may comprise determining, based on one or more criteria associated with the certificate, that the certificate is invalid and acceptable. The method may also comprise based at least in part on the certificate being invalid and acceptable, moving the edge device to a quarantine state. The method may further comprise causing a notification to be displayed on a user interface, the notification indicating the edge device being moved to the quarantine state.

Another method to perform the techniques described herein may be implemented by a controller of a network that manages control connections of a plurality of edge devices within the network. The method may comprise maintaining, for the plurality of edge devices, the control connections between the plurality of edge devices and the controller. The method may comprise receiving, from an edge device of the plurality of edge devices, data associated with a certificate of the edge device. The method may also include determining, based on one or more criteria associated with the certificate, that the certificate is invalid and acceptable. Additionally, the method may comprise based at least in part on the certificate being invalid and acceptable, moving the edge device from a valid state to a quarantine state. The method may further comprise causing a notification to be displayed on a user interface, the notification indicating the edge device being moved to the quarantine state.

Additionally, any techniques described herein, may be performed by a system and/or device having non-transitory computer-readable media storing computer-executable instructions that, when executed by one or more processors, performs the method(s) described above and/or one or more non-transitory computer-readable media storing computer-readable instructions that, when executed by one or more processors, cause the one or more processors to perform the method(s) described herein.

Example Embodiments

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of networks, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches may allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

An example network is a software defined wide area network (SD-WAN). Certificates are a critical part of authentication and authorization for establishing secure connections for the SD-WAN control plane. The "certificate" refers to certificates that edge devices may present to controllers within the control plane for secure control connection establishment. A certificate may become invalid if it expires, any of its issuer certificates expire, the issuer certificate is missing from the trust store, and many other reasons. Time, changes in the network, or data corruption may also lead to the invalidation of a certificate.

The validity of these certificates plays a key role in determining whether a control connection is allowed to establish or not. The SD-WAN control plane has been designed so that control connection establishment attempts are automatically rejected for edge devices presenting invalid certificates. In these situations, an edge device must be re-onboarded (e.g., such as via out-of-band access or physical access to the edge device). As a result, existing SD-WAN infrastructure does not enable certificate issues to be corrected and requires the edge device to be re-onboarded in order to re-enter the network (e.g., after the certificate has been corrected). Further, providing OOB access and/or physical access to an edge device provides a security risk to the network.

Moreover, existing techniques for managing certificates include using a certificate revocation list (CRL), which is a collection of certificates no longer considered valid by the issuing certificate authority (CA). Some SD-WAN networks and devices support the RFC 5280 definition of CRL for third-party (enterprise) CAs. A certificate may be revoked and appear on a CRL for a number of reasons: a certificate's private key has been compromised; the CA incorrectly issues a certificate; the CA itself has been compromised; some organizational details have changed; etc. CRLs can grow to a very large size, so it does need to be trimmed over time by removing certificates. All certificates have a validity period, a start date in which the certificate first becomes valid and an end date in which the certificate expires. It is the end date that is used to facilitate the removal of a certificate from a CRL as expired certificates are, in general, no longer considered valid. In general, CRL protects various entities along the chain of trust from varying security risks.

However, the use of CRLs does not provide flexibility or the ability to react in various situations. For instance, where a root CA certificate expires, a customer SD-WAN may experience large outages. In this instance, the user needs to generate and deploy massive amounts of software across many different versions and re-deploy the network to re-establish connectivity to the affected edge devices. In some cases, re-onboarding the edge devices may be required, such as where there is a complete loss of connectivity and/or physical access to the network. This is not only time intensive but costly across the network.

Accordingly, there is a need for a flexible, cost effective, and more secure way to manage control connections between edge devices and controllers within a SD-WAN.

As used herein, "certificates" refers to the certificates that edge devices present to controllers for secure control connection establishment. As used herein "controller" and/or "controllers" refers to devices within the control plane.

This disclosure describes techniques for establishing stateful multi-privileged control connections between edge devices and a controller of a SD-WAN. In some examples, the system may be implemented by a controller of a network that manages control connections. In some examples, the system may receive a request from an edge device to form a control connection with the controller and access the network, the request including a certificate. In some examples, the system may determine, based on one or more criteria associated with the certificate, that the certificate is invalid and acceptable. In some examples, the system may, based at least in part on the certificate being invalid and acceptable, move the edge device to a quarantine state. This disclosure also describes techniques for managing stateful multi-privileged control connections between edge devices and a controller of a SD-WAN. In some examples, the system may maintain, for the plurality of edge devices, the control connections between the plurality of edge devices and the controller. In some examples, the system may receive, from an edge device of the plurality of edge devices, data associated with a certificate of the edge device. In some examples, the system may determine, based on one or more criteria associated with the certificate, that the certificate is invalid and acceptable. In some examples, based at least in part on the certificate being invalid and acceptable, the system may move the edge device from a valid state to a quarantine state. In some examples, the system may cause a notification to be displayed on a user interface, the notification indicating the edge device being moved to the quarantine state.

In some examples, the control connection may comprise a stateful multi-privileged control connection (SMPCC), such that a state of the certificate influences the state of the edge device within the network. The edge device state may be affected by the levels of trust that can be established during authentication of the edge device by the controller. In some examples, authentication of the edge device (e.g., using the certificate) influences what privileges the controller allows the edge device to have within the network.

In some examples, when the controller verifies a certificate of an edge device, the controller may consider the certificate validity and acceptability. In some examples, the controller may verify the certificate using one or more criteria. The one or more criteria may comprise an expiration of the certificate, an expiration of one or more issuer certificates, corruption of the certificate, an invalid serial number (e.g., serial number of a certificate does not match a list of valid devices), or an error code associated with the certificate (e.g., such as 509 checks resulting in an error code). Based at least in part on the one or more criteria, the controller may classify the certificate as valid, invalid and acceptable, or invalid and unacceptable.

In some examples, the system may determine a device state associated with the edge device. In some examples, such as where the controller determines a certificate is invalid and acceptable, the controller may move the edge device into a quarantine state. In some examples, the edge device may be moved into the quarantine state from either a staging state or a valid state. In some examples, moving an edge device to the quarantine state may comprise the controller restricting and/or stopping the edge device's access to the data plane in order to mitigate security risk and maintaining the control connection and the edge device's access to the control plane to allow for corrective actions. In some examples, moving edge device(s) to the quarantine state may occur in real-time. In some examples, moving edge device(s) to the quarantine state may occur on a per-device basis and/or in response to input from an administrator.

In some examples, the corrective actions may comprise enabling an administrator to push a new certificate to the edge device, issue an updated certificate to the edge device, etc. In some examples, once a certificate has been corrected, the controller may move the edge device back into either the staging state or the valid state.

In this way, the quarantine state allows a network administrator to clearly identify edge devices that have not been fully authenticated. The quarantine state further provides administrators tools to restrict device privileges as well as correct certificate issues without requiring out-of-band or physical access to the edge device. In this way the system may, based on certificate issues with an edge device, keep control connections up, to allow for remediation of the certificate issues, but disallow the edge device from taking part in certain actions (such as participating in the data plane) to reduce security risks as the edge device cannot be fully authenticated.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of a system 100 to provide stateful multi-privileged control connections between edge devices and controllers in a SD-WAN as described herein. While the system 100 shows an example controller 110, it is understood that any of the components of the system may be implemented on any device in the network 102.

In some examples, the system 100 may include a network 102 that includes edge device(s) 104. The network 102 may include one or more networks implemented by any viable communication technology, such as wired and/or wireless modalities and/or technologies. The network 102 may include any combination of Personal Area Networks (PANs), software defined cloud interconnects (SDCI), Local Area Networks (LANs), Campus Area Networks (CANs), Metropolitan Area Networks (MANs), extranets, intranets, the Internet, short-range wireless communication networks (e.g., ZigBee, Bluetooth, etc.), Wide Area Networks (WANs)—both centralized and/or distributed, software defined WANs (SD-WANs)—and/or any combination, permutation, and/or aggregation thereof. The network 102 may include devices, virtual resources, or other nodes that relay packets from one network segment to another by nodes in the computer network. The network 102 may include multiple devices that utilize the network layer (and/or session layer, transport layer, etc.) in the OSI model for packet forwarding, and/or other layers.

The system 100 may comprise a controller 110. In some examples, the controller 110 corresponds to a system that has complete visibility into the security fabric of a given network (e.g., enterprise network, smaller network, etc.). In some examples, the controller 110 may comprise a memory, one or more processors, etc. In some examples, the controller 110 may comprise a plurality of controllers. In some examples, the controller 110 may be integrated as part of Cisco's vSmart feature, Cisco's vManage feature, Cisco's vBond feature, and/or included in a SD-WAN architecture.

The controller 110 may be configured to communicate with one or more network device(s). For instance, the controller 110 may receive network data (e.g., network traffic load data, network client data, etc.) or other data (e.g., application load data, data associated with WLCs, APs, etc.) from the network device(s). The network device(s) may comprise routers, switches, access points, stations, radios, and/or any other network device. In some examples, the network device(s) may monitor traffic flow(s) within the network and may report information associated with the traffic flow(s) to the controller 110.

In some examples, the system comprises branch(es) 106 and/or hub(s) 108. In some examples, the branch(es) 106 comprise one or more user(s), mobile device(s), and/or Internet of Things (IoT) device(s) located at one or more locations. In some examples, the hub(s) 108 may comprise one or more network device(s), gateway device(s) (also referred to herein as "gateways"), tunneling interfaces, etc.

In some examples, the branch(es) 106 communicate via edge device(s) 104. In some examples, the edge device(s) 104 comprise one or more routers, access point(s), and/or any other network device. In some examples, the edge device(s) 104 may comprise an ingress and/or egress router. In some examples, the network device(s) may comprise a SDCI router and/or headend device. In some examples, the branch(es) 106 and/or hub(s) 108 communicate with each other, the controller 110, and/or cloud providers (e.g., SaaS, Internet, IaaS, etc.) via the network(s) 102.

In some examples, the edge device(s) 104 may communicate information. For instance, the edge device(s) 104 may send data packet(s) 112 associated with data flows to other network device(s) and/or the controller. In some examples, the data packet(s) 112 and/or metadata associated with the data packet(s) 112 may be sent to and/or monitored by the controller 110.

In some examples, the controller 110 may be configured to monitor the data packets 112. In some examples, the data packets may comprise data (e.g., which application is used, by which station, traffic characteristics and duration, etc.) associated with network traffic and may store the data as part of the system and/or controller 110 (e.g., such as in a network database(s) 114 and/or memory associated with the controller 110).

In some examples, the data packets 112 may comprise a request for an edge device 104 to form a control connection with the controller 110 and access the network 102. In some examples, the request comprises a certificate. In some examples, the data packets 112 may comprise a certificate and/or certificate data associated with an edge device 104 that has already formed a control connection with the controller 110. In some examples, the control connection may comprise a stateful multi-privileged control connection (SMPCC).

In some examples, the controller 110 may store the data packets, certificate data, and/or any other data associated with the network in the network database(s) 114 and/or memory associated with the controller 110. For instance, the controller 110 may maintain and update a list of device state(s) associated with edge device(s) 104 in the network 102.

In some examples, the controller 110 may be configured to communicate with administrator device(s) 116. As illustrated, the administrator device(s) 116 may comprise an application 118. In some examples, the application 118 may correspond to an application provided by a service provider (e.g., such as Cisco) that enables an administrator of the network 102 to access the controller 110. For instance, the application 118 may correspond to Cisco's vSmart feature, Cisco's vBond feature, and/or Cisco's vManage feature.

In some examples, the controller 110 may send health data 120 to the application 118 and/or administrator device 116. For instance, the health data 120 may comprise indications of edge device health within the network. In some examples, the health data 120 comprises an alert and/or notification to be displayed on a user interface of the administrator device 116. For example, the user interface may display an indication of health for an edge device with an invalid certificate, which would be reflected as "poor". In some examples, certificates about to expire in the near future as fair and devices with valid certificate with a reasonable lead time before expiry may be displayed as being in "good health." In some examples, the application 118 may be configured to receive the health data from the controller and generate alarms which may be used to reflect the health of the edge devices.

In some examples, the controller 110 may be configured to manage control connection(s) (e.g., SMPCCs) of edge device(s) 104 within the network. For instance, the controller 110 may be configured to manage an edge device's access to a control plane and/or a data plane of the network 102.

In some examples, administrator device(s) 116 may send instruction(s) 122 to the controller 110. In some examples, the instruction(s) 122 may comprise a corrective action associated with an edge device 104. For instance, where an edge device 104 has been moved to the quarantine state, the administrator device 116 may display a notification on the user interface. In response, an administrator and/or user of the administrator device 116 may provide input indicating a corrective action to take with respect to the edge device. In some examples, the corrective action may comprise instructions to install a new certificate onto the edge device 104 via the control connection (e.g., SMPCC) and/or instructions to remove the edge device from the network 102 so that it may be re-onboarded.

At "1", the system may receive a request from an edge device to form a control connection and access a network. As noted above, the network may comprise a SD-WAN. In some examples, the control connection comprises SMPCC. As noted above the request may comprise a certificate associated with the edge device.

At "2", the system may determine a state of the edge device. In some examples, the state corresponds to a device state. For example, the system may determine that the edge device is currently assigned a valid state, a staging state, or an invalid state. In some examples, the current device state(s) associated with edge device(s) 104 in the network may be stored by the controller 110 in memory and/or in network database(s) 114.

At "3", the system may determine that the certificate is invalid and acceptable. For instance, the system may utilize criteria associated with the certificate to determine a classification of the certificate. The one or more criteria may comprise an expiration of the certificate, an expiration of one or more issuer certificates, corruption of the certificate, an invalid serial number (e.g., serial number of a certificate does not match a list of valid devices), or an error code associated with the certificate (e.g., such as 509 checks resulting in an error code).

At "4", the system may move the edge device to a quarantine state. In some examples, the edge device may be moved from a valid state or a staging state to the quarantine state. In some examples, the system may update a list stored in memory of the system and/or network database(s) 114, the list being associated with a plurality of edge devices in the network and comprising a device state associated with each of the plurality of edge devices. For instance, the system may update the device state associated with the edge device from one of a valid state or a staging state to the quarantine state. In some examples, the system may remove and/or restrict access of the edge device to a data plane of the network and/or maintain the control connection with the edge device to enable access to a control plane of the network.

At "5", the system may generate and cause a notification to be displayed on a user interface. For instance, the system may cause an alert to be generated and displayed on a user interface of administrator device 116. In some examples, the notification may comprise indications of health associated with all edge device(s) 104 in the network. In some examples, the notification includes an indication that the edge device has a certificate that is invalid and acceptable and/or requests input. For instance, the notification may request instructions as to move the edge device to a quarantine state. In some examples, the notification may be generated in real-time and in response to the edge device being moved to the quarantine state. In some examples, the alert and/or notification may be generated by the application 118 based at least in part on receiving health data 120.

In this way, the system may provide greater flexibility in maintaining control connections in a SD-WAN and improve network security. By utilizing SMPCC connections and introducing a new quarantine state, SD-WAN infrastructure is improved by enabling an administrator to correct certificates of edge devices via control connection and without requiring the device to be re-onboarded. Further, the system enables administrators to identify which edge devices in the network are operating on invalid certificates and introduces a new quarantine state that edge devices may be placed automatically or on a device-by-device basis. Further, by integrating validation of certificates for control connection establishment as an integral part of the SD-WAN infrastructure, the system reduces security risks seen in less secure OOB connections.

FIG. 2 illustrates an example of certificate verification classifications associated with the system described in FIG. 1. As illustrated and noted above, a controller (e.g., such as controller 110) may determine a classification of a certificate associated with an edge device 104. As illustrated, the classifications may comprise determining a certificate is valid 202, invalid and acceptable 204, or invalid and unacceptable 206.

A certificate is valid 202, where the controller is able to fully verify the certificate. In this example, the controller may assign the edge device a valid state, such that the edge device has full privileges and can access data plane. That is, during control connection establishment, if the certificate is valid, then the control connection may come up with no change to the device state for the edge device in the network.

A certificate is invalid and acceptable 204 if the controller determines the certificate meets some minimum criteria. For example, if the certificate has expired, but everything else about the certificate passes the verification (e.g., such as serial number and other attributes of the certificate are still valid), then it is acceptable. In this example, the edge device associated with the certificate may be moved to a quarantine state.

A certificate is invalid and unacceptable 206 where the controller is unable to verify some minimum level of criteria. For example, the certificate itself may not be decodable because the data was corrupted, or it may have been issued from an untrusted CA. In this example, any request to form a control connection between the edge device and the controller will be rejected by the controller. In some examples, the edge device may be assigned an invalid state via input by a user to the administrator device(s) 116.

FIG. 3A illustrates examples of edge device states in accordance with the techniques described in FIGS. 1-2 herein. As illustrated, each edge device state comprises an edge device 104. In some examples, an edge with valid certificates that has been onboarded into the SD-WAN and is allowed to form control connections may be in one of the following states: valid state 302 or staging state 304. As illustrated, in the valid state 302, edge device 104 has access to the control plane and the data plane of the network (SD-WAN). A device may be placed in the valid state 302 where the certificate has been fully verified and the edge device has not been marked for maintenance (e.g., such as by an administrator of the network). An edge device 104 may be placed in the staging state 304 where the edge device 104 has a valid certificate and has been marked for maintenance. For instance, an administrator may send instructions to controller 110 to place one or more edge device(s) in staging state 304 in order to provide a software upgrade to the edge device(s). As illustrated, in the staging state 304, the edge device 104 has access to the control plane (e.g., via a control connection to the controller 110), but does not have access to the data plane of the network.

As described above, an edge device may be placed in the quarantine state 306 where a certificate is determined to be invalid but acceptable. As illustrated in FIG. 3A, in the quarantine state 306, the edge device 104 has access to the control plane (e.g., via a control connection with the controller), but does not have access to the data plane. As noted above, the quarantine state 306 is a new state introduced in this disclosure to improve flexibility of SD-WANs and provide flexibility in addressing certificate issues.

As noted above, any attempt to form a control connection with the controller by an edge device with an invalid and unacceptable certificate is rejected by the controller. In some examples, a user may place an edge device into an invalid state 308, such as through input to the administrator device(s) 116. As illustrated, in the invalid state 308, an edge device 104 does not have access to either the control plane or the data plane, as no control connection with the controller is formed.

Figure 3B:
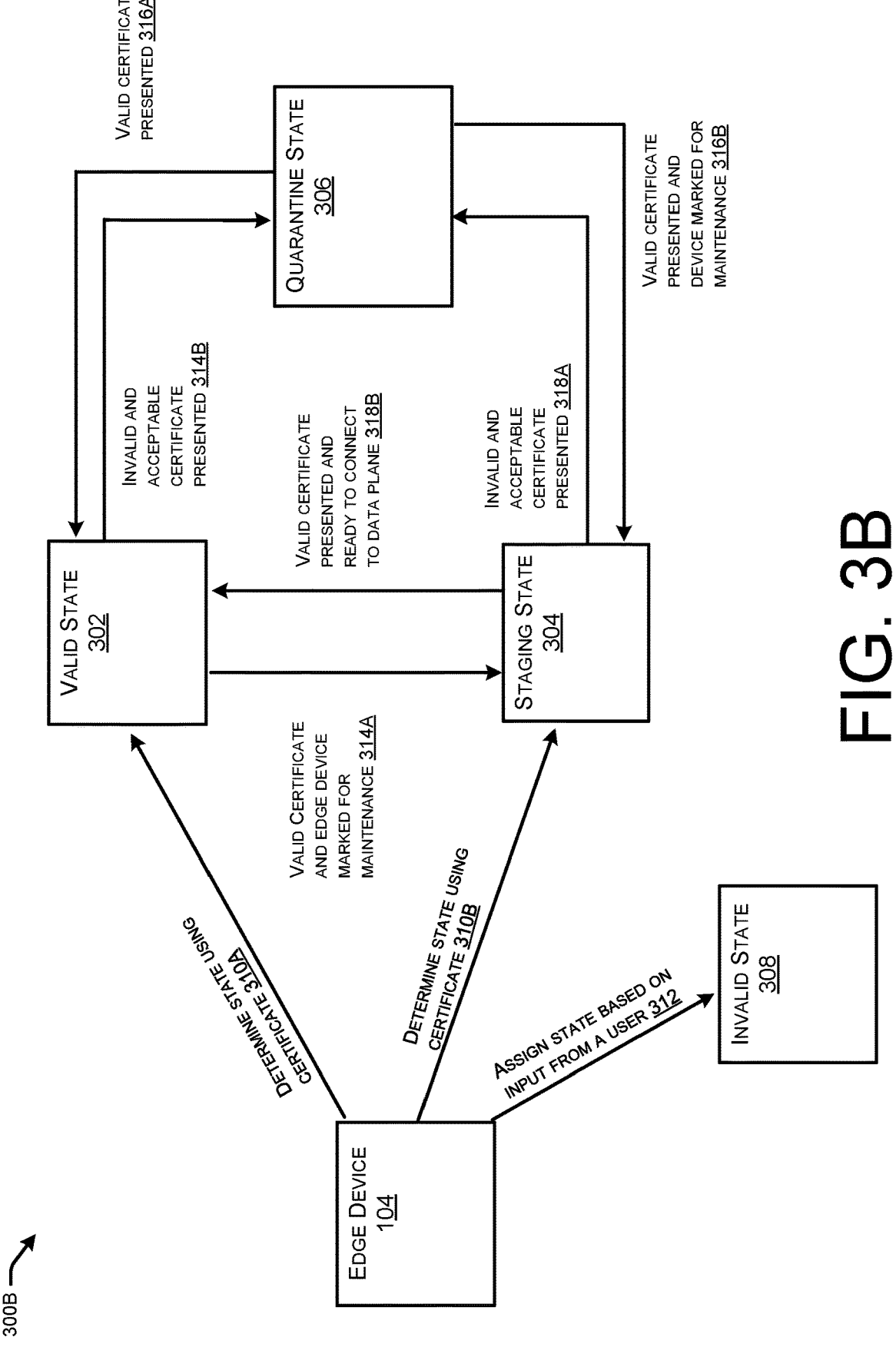
FIG. 3B illustrate an example of device state transitions based on a certificate presented during a control connection bring up using the techniques described herein.

FIG. 3B illustrates an example of edge device state transitions based on a certificate presented by an edge device during a control connection bring up in accordance with the techniques described in FIGS. 1-3A herein. As illustrated, the example includes edge device 104. It is understood that any reference to order of transitions between edge device states is for illustrative purposes only and is not limiting on the disclosed techniques.

At 310, a controller (not shown) may determine an initial edge device state using a certificate of the edge device. As described above, the initial edge device state may comprise one of a valid state 302 (e.g., 310A) or a staging state 304 (e.g., 310B). As noted above, the edge device may be moved to an invalid state 308 (e.g., 312) based on receiving instructions from a controller, where the instructions are input by a user via the administrator device (e.g., administrator device(s) 116). An edge device in the valid state 302 may be moved to either the quarantine state 306 or the staging state 304. As illustrated, at 314A an edge device may be moved to the staging state 304 where a controller determines the edge device has a valid certificate, but has been marked for maintenance (e.g., software upgrade, etc.). As illustrated by 314B, an edge device may be moved to the quarantine state 306 where the controller determines that the certificate is invalid and acceptable.

Where an edge device is in the staging state, it may transition to the valid state 302 or the quarantine state 306. For instance, at 318A, a controller may move the edge device from the staging state 304 to the quarantine state 306 where the controller determines the certificate of the edge device is invalid and acceptable. As shown by 318B, a controller may move the edge device from the staging state 304 to the valid state 302 where the controller determines that the certificate is valid and the edge device is ready to connect to the data plane (e.g., such as when a software upgrade has been completed).

An edge device in the quarantine state 306 may transition to the valid state 302 or the staging state 304. As illustrated by 316A, a controller may move the edge device from the quarantine state 306 to the valid state 302 where the controller determines the edge device has presented a valid certificate. For example, this may occur after receiving instructions from administrator device 116 to install a new certificate on the edge device and/or correct the certificate of the edge device via the control connection. As illustrated by 316B, the controller may move the edge device from the quarantine state 306 to the staging state 304 where the controller determines that a valid certificate is presented and the edge device is marked for maintenance.

Figure 4:
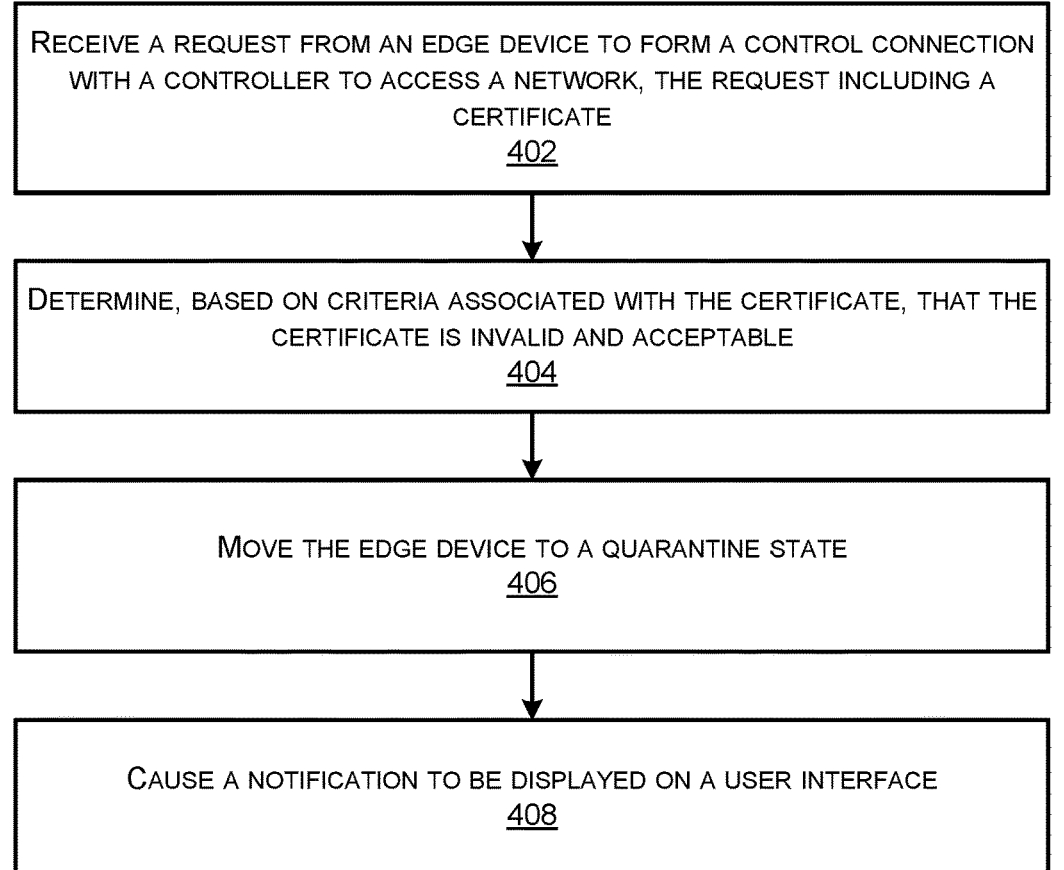
FIG. 4 illustrates a flow diagram of an example method for establishing a stateful multi-privileged control connection between an edge device and a controller using the system described in FIGS. 1-3.

FIG. 4 illustrates a flow diagram of an example system 400 for establishing a stateful multi-privileged control connection between an edge device and a controller using the system described in FIGS. 1-3. In some instances, the steps of system 400 may be performed by one or more devices (e.g., controller 110, edge device(s) 104, etc.) that include one or more processors and one or more non-transitory computer-readable media storing computer-executable instructions that, when executed by the one or more processors, cause the one or more processors to perform operations of system 400.

At 402, the system may receive a request from an edge device to form a control connection with a controller to access a network, the request including a certificate. In some examples, the network comprises a SD-WAN. In some examples, the control connections comprise stateful multi-privileged control connections.

At 404, the system may determine, based on criteria associated with the certificate, that the certificate is invalid and acceptable. In some examples, the criteria comprises one or more an expiration of the certificate, an expiration of one or more issuer certificates, corruption of the certificate, an invalid serial number, or an error code.

At 406, the system may move the edge device to a quarantine state. In some examples, moving the edge device to the quarantine state comprises updating, by the controller and based on accessing a list associated with a plurality of edge devices in the network, a state associated with the edge device from one of a valid state or a staging state to the quarantine state. In some examples, moving the edge device to the quarantine state additionally or alternatively comprises removing, by the controller, access of the edge device to a data plane of the network and maintaining, by the controller, the control connection with the edge device to enable access to a control plane of the network.

In some examples, prior to step 406, the system may cause a notification to be displayed on the user interface, the notification indicating that the edge device is invalid and acceptable. The system may receive, via the user interface, input requesting the edge device be moved to the quarantine state, and based at least in part on the input, moving the edge device to the quarantine state. For instance, in some examples, the user interface comprises an application interface (e.g., such as Cisco's vManage) that an administrator may use to monitor the SD-WAN. Accordingly, the system may move the edge device to the quarantine state either automatically or on a per-device basis.

At 408, the system may cause a notification to be displayed on a user interface. In some examples, the user interface further displays data associated with a plurality of edge devices within the network, the data comprising health data associated with the network.

In some examples, the system may receive, via the user interface, input indicating a corrective action associated with the edge device. In some examples, the controller may perform the corrective action and, based at least in part on performing the corrective action, moving the edge device from the quarantine state to a valid state, wherein the valid state enables access to a data plane of the network FIG. 5 illustrates a flow diagram of an example system 500 for managing stateful multi-privileged control connections using the system described in FIGS. 1-4. In some instances, the steps of system 500 may be performed by one or more devices (e.g., controller 110, edge device(s) 104, etc.) that include one or more processors and one or more non-transitory computer-readable media storing computer-executable instructions that, when executed by the one or more processors, cause the one or more processors to perform operations of system 500. In some examples, the steps of FIG. 5 may be performed in combination with the steps of FIG. 4.

At 502, the system may maintain control connection(s) between a plurality of edge devices and a controller of a network. For example, the system may utilize a controller to manage the control connection(s). In some examples, each of the plurality of edge devices have been authenticated by the controller to access the control plane and/or data plane of the network (e.g., each edge device is in either the staging state or valid state described above). In some examples, the network comprises a SD-WAN. In some examples, the control connections comprise stateful multi-privileged control connections.

At 504, the system may receive, from an edge device of the plurality of edge devices, data associated with a certificate of the edge device. In some examples, the data associated with the certificate indicates a health of the certificate (e.g., whether there are any health issues with the certificate, if the certificate is invalid, etc.).

At 506, the system may determine, based on criteria associated with the certificate, that the certificate is invalid and acceptable. In some examples, the criteria comprises one or more an expiration of the certificate, an expiration of one or more issuer certificates, corruption of the certificate, an invalid serial number, or an error code.

At 508, the system may move the edge device from a valid state to a quarantine state. In some examples, moving the edge device to the quarantine state comprises updating, by the controller and based on accessing a list associated with a plurality of edge devices in the network, a state associated with the edge device from the valid state to the quarantine state. In some examples, moving the edge device to the quarantine state additionally or alternatively comprises removing, by the controller, access of the edge device to a data plane of the network and maintaining, by the controller, the control connection with the edge device to enable access to a control plane of the network. In some examples, the system may move the edge device from a staging state to the quarantine state.

In some examples, prior to step 406, the system may cause a notification to be displayed on the user interface, the notification indicating that the edge device is invalid and acceptable. The system may receive, via the user interface, input requesting the edge device be moved to the quarantine state, and based at least in part on the input, moving the edge device to the quarantine state. For instance, in some examples, the user interface comprises an application interface (e.g., such as Cisco's vManage) that an administrator may use to monitor the SD-WAN. Accordingly, the system may move the edge device to the quarantine state either automatically or on a per-device basis.

At 510, the system may cause a notification to be displayed on a user interface. In some examples, the user interface further displays data associated with a plurality of edge devices within the network, the data comprising health data associated with the network.

In some examples, the system may receive, via the user interface, input indicating a corrective action associated with the edge device. In some examples, the controller may perform the corrective action and, based at least in part on performing the corrective action, moving the edge device from the quarantine state to a valid state, wherein the valid state enables access to a data plane of the network.

Figure 6:
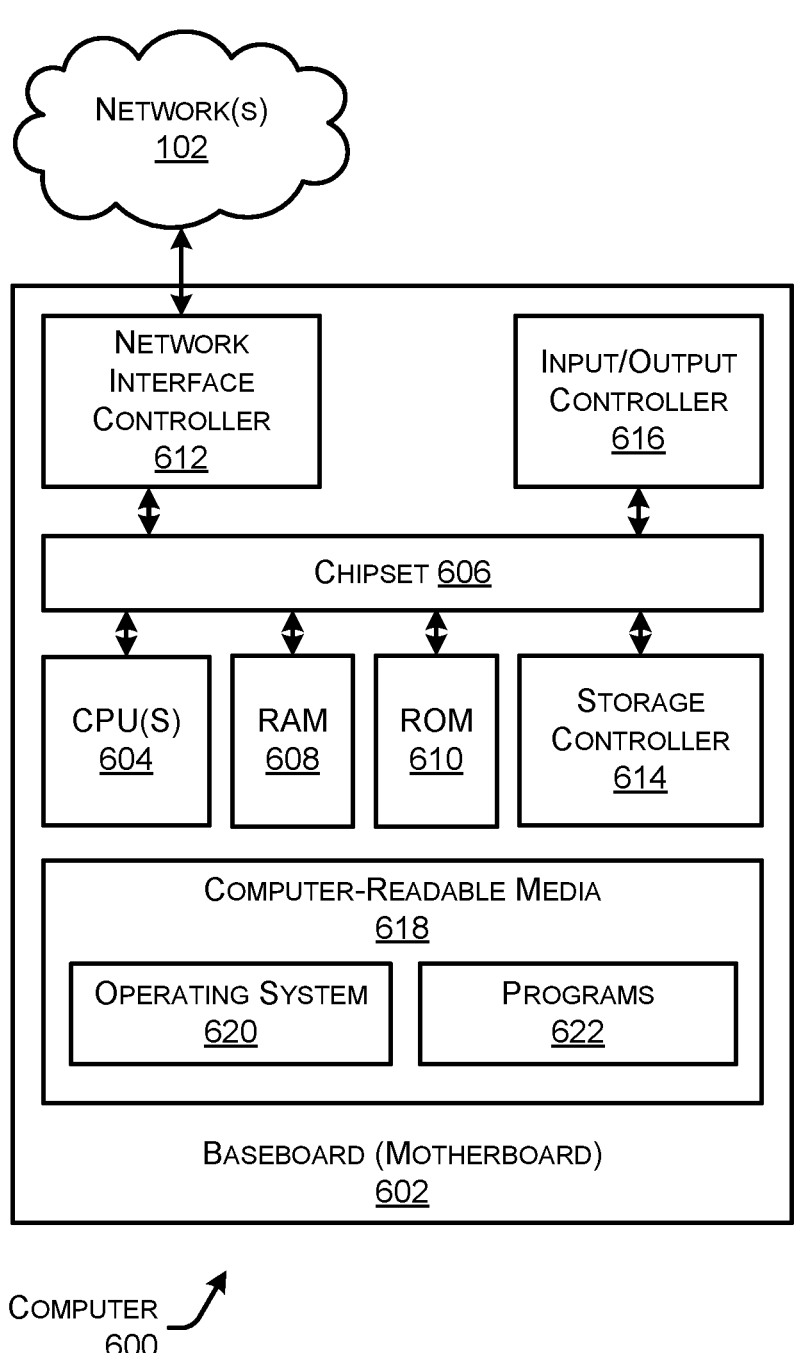
FIG. 6 is a computer architecture diagram showing an illustrative computer hardware architecture for implementing a device that can be utilized to implement aspects of the various technologies presented herein.

FIG. 6 shows an example computer architecture for a device capable of executing program components for implementing the functionality described above. The computer architecture shown in FIG. 6 illustrates any type of computer 600, such as a conventional server computer, workstation, desktop computer, laptop, tablet, network appliance, e-reader, smartphone, or other computing device, and can be utilized to execute any of the software components presented herein. The computer may, in some examples, correspond to a controller 110 and/or any other device described herein, and may comprise personal devices (e.g., smartphones, tablets, wearable devices, laptop devices, etc.) networked devices such as servers, switches, routers, hubs, bridges, gateways, modems, repeaters, access points, and/or any other type of computing device that may be running any type of software and/or virtualization technology.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as network 102. The chipset 606 can include functionality for providing network connectivity through a NIC 612, such as a gigabit Ethernet adapter. The NIC 612 is capable of connecting the computer 600 to other computing devices over the network 102. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program components, data structures, or other data. It should be appreciated by those skilled in the art that computer-readable storage media is any available media that provides for the non-transitory storage of data and that can be accessed by the computer 600. In some examples, the operations performed by the controller 110 and/or any components included therein, may be supported by one or more devices similar to computer 600. Stated otherwise, some or all of the operations performed by the controller 110 and/or any components included therein, may be performed by computer 600 and/or one or more computer devices.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

As described herein, the computer 600 may comprise one or more of a controller 110 and/or any other device. The computer 600 may include one or more hardware processors (processor(s)) configured to execute one or more stored instructions. The processor(s) (e.g., CPUs 604) may comprise one or more cores. Further, the computer 600 may include one or more network interfaces configured to provide communications between the computer 600 and other devices, such as the communications described herein as being performed by the controller 110 and/or any other device. The network interfaces may include devices configured to couple to personal area networks (PANs), wired and wireless local area networks (LANs), wired and wireless wide area networks (WANs), SDWANs, and so forth. For example, the network interfaces may include devices compatible with Ethernet, Wi-Fi™, and so forth.

The programs 622 may comprise any type of programs or processes to perform the techniques described in this disclosure. For instance, the programs 622 may cause the computer 600 to perform techniques including receiving a request from an edge device to form a control connection with the controller and access the network, the request including a certificate; determining, based on one or more criteria associated with the certificate, that the certificate is invalid and acceptable; based at least in part on the certificate being invalid and acceptable, moving the edge device to a quarantine state; and causing a notification to be displayed on a user interface, the notification indicating the edge device being moved to the quarantine state.

The programs 622 may additionally or alternatively cause the computer 600 to perform techniques including maintaining, for the plurality of edge devices, the control connections between the plurality of edge devices and the controller; receiving, from an edge device of the plurality of edge devices, data associated with a certificate of the edge device; determining, based on one or more criteria associated with the certificate, that the certificate is invalid and acceptable; based at least in part on the certificate being invalid and acceptable, moving the edge device from a valid state to a quarantine state; and causing a notification to be displayed on a user interface, the notification indicating the edge device being moved to the quarantine state.

In this way, the computer 600 can utilize SMPCCs within the SD-WAN infrastructure to provide greater flexibility in managing control connections and improve network security. By utilizing SMPCC connections and introducing a new quarantine state, SD-WAN infrastructure is improved by enabling an administrator to correct certificates of edge devices via secure control connections and without requiring the edge device to be re-onboarded. Further, the computer 600 may enable administrators to identify which edge devices in the network are operating on invalid certificates and introduces a new quarantine state that edge devices may be placed automatically or on a device-by-device basis. The computer 600 can also provide visibility into critical certificate issues and affected devices within the network. Further, by integrating validation of certificates for control connection establishment as an integral part of the SD-WAN infrastructure, the computer can reduce security risks seen in less secure OOB connections.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method implemented by a controller of a network that manages control connections within the network, the method comprising:

receiving a request from an edge device to form a control connection with the controller and access the network, the request including a certificate;

determining that the certificate is invalid by determining that the certificate has expired based on an expiration of the certificate;

determining that the certificate is acceptable by determining that the certificate is at least one of not corrupted, has a valid serial number, was issued by a trusted certificate authority, or does not include a security compromise indicator;

based at least in part on the certificate being invalid and acceptable, moving the edge device to a quarantine state, wherein moving the edge device to the quarantine state comprises:

removing, by the controller, access of the edge device to a data plane of the network; and maintaining, by the controller, the control connection with the edge device to enable access to a control plane of the network; and while the edge device is in the quarantine state:

enabling the edge device to utilize the control connection to access the control plane to remediate the certificate being invalid and acceptable;

communicating, via the control plane, an updated certificate to the edge device; and receiving, at the control plane device, the updated certificate from the edge device; and in response to determining that the updated certificate is valid, moving the edge device out of the quarantine state by providing the edge device with access to the data plane of the network.

2. The method of claim 1, wherein the network comprises a Software-Defined Wide Area Network (SD-WAN) and wherein the control connections comprise stateful multi-privileged control connections.

3. The method of claim 1, wherein moving the edge device to the quarantine state comprises:

updating, by the controller and based on accessing a list associated with a plurality of edge devices in the network, a state associated with the edge device from one of a valid state or a staging state to the quarantine state.

4. The method of claim 1, further comprising:

receiving input indicating a corrective action associated with the edge device;

performing, by the controller, the corrective action; and based at least in part on performing the corrective action, moving the edge device from the quarantine state to a valid state, wherein the valid state enables access to the data plane of the network.

5. The method of claim 1, further comprising:

causing a notification to be displayed on a user interface, the notification indicating the edge device being moved to the quarantine state, wherein the user interface further displays data associated with a plurality of edge devices within the network, the data comprising health data associated with the network.

6. The method of claim 1, wherein prior to moving the edge device to the quarantine state, the method further comprises:

causing a notification to be displayed on a user interface, the notification indicating that the edge device is invalid and acceptable;

receiving, via the user interface, input requesting the edge device be moved to the quarantine state; and based at least in part on the input, moving the edge device to the quarantine state.

7. A system comprising:

one or more processors; and one or more non-transitory computer-readable media storing computer-executable instructions that, when executed by the one or more processors, cause the one or more processors to perform operations comprising:

receiving, by a controller of a network, a request from an edge device to form a control connection with the controller and access the network, the request including a certificate;

determining that the certificate is invalid by determining that the certificate has expired based on an expiration of the certificate;

determining that the certificate is acceptable by determining that the certificate is at least one of not corrupted, has a valid serial number, was issued by a trusted certificate authority, or does not include a security compromise indicator;

based at least in part on the certificate being invalid and acceptable, moving, by the controller, the edge device to a quarantine state, wherein moving the edge device to the quarantine state comprises:

removing, by the controller, access of the edge device to a data plane of the network; and maintaining, by the controller, the control connection with the edge device to enable access to a control plane of the network; and while the edge device is in the quarantine state:

enabling the edge device to utilize the control connection to access the control plane to remediate the certificate being invalid and acceptable;

communicating, via the control plane, an updated certificate to the edge device; and receiving, at the control plane device, the updated certificate from the edge device; and in response to determining that the updated certificate is valid, moving the edge device out of the quarantine state by providing the edge device with access to the data plane of the network.

8. The system of claim 7, wherein the network comprises a Software-Defined Wide Area Network (SD-WAN) and wherein the control connection comprises a stateful multi-privileged control connection.

9. The system of claim 7, wherein moving the edge device to the quarantine state comprises:

updating, by the controller and based on accessing a list associated with a plurality of edge devices in the network, a state associated with the edge device from one of a valid state or a staging state to the quarantine state.

10. The system of claim 7, the operations further comprising:

receiving, via a user interface, input indicating a corrective action associated with the edge device;

performing, by the controller, the corrective action; and based at least in part on performing the corrective action, moving the edge device from the quarantine state to a valid state, wherein the valid state enables access to the data plane of the network.

11. The system of claim 7, wherein a user interface further displays data associated with a plurality of edge devices within the network, the data comprising health data associated with the network.

12. The system of claim 7, wherein prior to moving the edge device to the quarantine state, the operations further comprise:

causing a notification to be displayed on a user interface, the notification indicating that the edge device is invalid and acceptable;

receiving, via the user interface, input requesting the edge device be moved to the quarantine state; and based at least in part on the input, moving the edge device to the quarantine state.

13. A method implemented by a controller of a network that manages control connections of a plurality of edge devices within the network, the method comprising:

maintaining, for the plurality of edge devices, the control connections between the plurality of edge devices and the controller;

receiving, from an edge device of the plurality of edge devices, data associated with a certificate of the edge device;

determining that the certificate is invalid by determining that the certificate has expired based on an expiration of the certificate;

determining that the certificate is acceptable by determining that the certificate is at least one of not corrupted, has a valid serial number, was issued by a trusted certificate authority, or does not include a security compromise indicator;

based at least in part on the certificate being invalid and acceptable, moving the edge device from a valid state to a quarantine state, wherein moving the edge device to the quarantine state comprises:

removing, by the controller, access of the edge device to a data plane of the network; and maintaining, by the controller, the control connection with the edge device to enable access to a control plane of the network; and while the edge device is in the quarantine state:

enabling the edge device to utilize the control connection to access the control plane to remediate the certificate being invalid and acceptable;

communicating, via the control plane, an updated certificate to the edge device; and receiving, at the control plane device, the updated certificate from the edge device; and in response to determining that the updated certificate is valid, moving the edge device out of the quarantine state by providing the edge device with access to the data plane of the network.

14. The method of claim 13, wherein the network comprises a Software-Defined Wide Area Network (SD-WAN), and wherein the control connections comprise stateful multi-privileged control connections.

15. The method of claim 13, further comprising:

receiving, via a user interface, input indicating a corrective action associated with the edge device;

performing, by the controller, the corrective action; and based at least in part on performing the corrective action, moving the edge device from the quarantine state to the valid state, wherein the valid state enables access to the data plane of the network.

* * * * *